(12) United States Patent
Butters et al.

(10) Patent No.: US 8,838,439 B2
(45) Date of Patent: Sep. 16, 2014

(54) ENTITY RECOGNITION

(75) Inventors: Jonathan D. Butters, Huddersfield (GB); Fabio Ciravegna, Sheffield (GB); Colin Cadas, Derby (GB); Andrew Harrison, Derby (GB)

(73) Assignee: Rolls-Royce PLC, London (GB)

( * ) Notice: Subject to any disclaimer, the term of this patent is extended or adjusted under 35 U.S.C. 154(b) by 507 days.

(21) Appl. No.: 13/156,622

(22) Filed: Jun. 9, 2011

(65) Prior Publication Data

US 2011/0320186 A1 Dec. 29, 2011

(30) Foreign Application Priority Data

Jun. 23, 2010 (GB) .................................. 1010545.0

(51) Int. Cl.
*G06F 17/20* (2006.01)
*G06F 17/27* (2006.01)
*G06F 17/30* (2006.01)

(52) U.S. Cl.
CPC ........ *G06F 17/278* (2013.01); *G06F 17/30672* (2013.01)
USPC .................................. 704/9; 704/1

(58) Field of Classification Search
CPC . G06F 17/27; G06F 17/2705; G06F 17/2735; G06F 17/2765; G06F 17/277; G06F 17/2775; G06F 17/2795; G06F 17/2785; G06F 17/30684; G06F 17/30666
USPC ........................ 704/9; 707/705; 715/230, 256
See application file for complete search history.

(56) References Cited

U.S. PATENT DOCUMENTS

| 5,774,588 | A | * | 6/1998 | Li | 382/230 |
| 5,940,624 | A | | 8/1999 | Kadashevich et al. | |
| 7,860,706 | B2 | * | 12/2010 | Abir | 704/4 |
| 7,912,705 | B2 | * | 3/2011 | Wasson et al. | 704/9 |
| 2003/0177000 | A1 | | 9/2003 | Mao et al. | |

(Continued)

FOREIGN PATENT DOCUMENTS

EP 2 104 044 A1 9/2009

OTHER PUBLICATIONS

Witschel, Hans Friedrich. "Using decision trees and text mining techniques for extending taxonomies." Proceedings of the Workshop on Learning and Extending Lexical Ontologies by Using Machine Learning Methods. 2005.*

(Continued)

*Primary Examiner* — Pierre-Louis Desir
*Assistant Examiner* — Matthew Baker
(74) *Attorney, Agent, or Firm* — Oliff PLC (57) ABSTRACT

The invention relates to a method of querying technical domains that recognizes the concepts represented by strings of characters, rather than merely comparing strings. It can be used to compute conceptual similarity between terms, The method employs string distance metrics and a cyclic progression of lexical processing to recognize constituent term concepts that are then combined to form full-term concepts by means of a grammar. Terms can be extracted and identified as being conceptually similar (or dissimilar) to other terms even if they have never previously been encountered. A key advantage is the ability to extract terms from documents based on the combination of a limited number of sub-concepts, This avoids the need for the prior identification of all possible terms that current methods require. A second key advantage is the ability to introduce or remove concepts and synonyms individually without the need to alter terms which the concept or synonym constitutes.

11 Claims, 6 Drawing Sheets

(56) References Cited

U.S. PATENT DOCUMENTS

| | | |
|---|---|---|
| 2005/0119873 A1 | 6/2005 | Chaney et al. |
| 2005/0267871 A1* | 12/2005 | Marchisio et al. ............... 707/3 |
| 2007/0073531 A1 | 3/2007 | Carter et al. |
| 2008/0270120 A1* | 10/2008 | Pestian et al. ..................... 704/9 |
| 2009/0259459 A1 | 10/2009 | Ceusters et al. |
| 2010/0010804 A1* | 1/2010 | Friedman et al. ................. 704/9 |
| 2010/0125596 A1 | 5/2010 | Goyal |
| 2010/0195909 A1* | 8/2010 | Wasson et al. ................ 382/176 |
| 2011/0040766 A1* | 2/2011 | Robinson et al. ............. 707/749 |

OTHER PUBLICATIONS

Oct. 18, 2012 Search Report issued in European Patent Application No. EP 11 16 9227.

* cited by examiner

Annotation = <Start Index, End Index, Order Number, CR, PoT, Type>

* Resolved Annotations 1
    -<16,20,1,STAGE 2,stageAndNumber,position>
    -<0,2,4,HP,sys,part>
    -<3,7,3,TURBINE,sys,obj,part>
* Resolved Annotations 2
    -<16,20,1,STAGE 2,stageAndNumber,position>
    -<0,7,1,HP TURBINE,sys,obj,part>
* Annotations List
    -<16,20,1,STAGE 2,stageAndNumber,position>
    -<0,7,1,HP TURBINE,sys,obj,part>
    -<8,15,3,BLADE,obj,type,part>

FIG. 4

Annotations
 -<16,20,1,STAGE 2,stageAndNumber,position>
 -<0,7,1,HP TURBINE,sys,obj,part>
 -<8,15,3,BLADE,obj,type,part>

Entities
 -<0,20,1,HP TURBINE BLADE STAGE 2,component>

FIG. 5

ENTITY RECOGNITION

CROSS-REFERENCE TO RELATED APPLICATIONS

This application is based upon and claims the benefit of priority from British Patent Application Number 1010545.0 filed 23 Jun. 2010, the entire contents of which are incorporated by reference.

BACKGROUND OF THE INVENTION

1. Field of the Invention

The invention is concerned with identifying and extracting information from character strings and documents, such as technical or scientific documents, and in particular documents in a specific field or domain.

2. Description of the Related Art

There are currently two main techniques of named-entity recognition (a more general problem of Terminology Recognition): rule-based methods and heuristic methods. Each technique has its own set of strengths and weaknesses.

Rule-based methods extract entities based on linguistic rules constructed by domain experts. Heuristic methods extract entities based on measurable features. Various properties could be used as features, for example where the entity is in relation to nearby words, or where the entity is within a table or document.

The linguistic rules required by rule-based methods are costly to produce and require input from both domain experts and linguists. Results from rule-based methods tend to be precise, but the inflexible nature of the rules mean that entities which differ slightly from the established rule are either mishandled or ignored. The second approach (which is more widely used) is based on machine learning and heuristics. In order to extract and recognise the semantic type of any entity, most machine-learning techniques require training, performed by providing examples of correctly extracted entities. The learning algorithm uses the training data to select features on which classification decisions are based. In the case of text documents, features such as the words immediately preceding or following an entity can be used to classify the entity—for example, a system can be trained to identify the token after the feature "engine serial number:" to be the serial number for that given engine.

One method of named-entity recognition (the extraction and identification of people, places, object, etc from text) in service documents is achieved by using gazetteer lists; these are lists of the terms expected within the domain of interest.

Lists of terms for different semantic types are produced, synonyms are added and any inflected forms are generated. Examples of entries in a parts gazetteer include:

"PYLON INTERFACE I/O 1 (D71423P) CONNECTR"
"PYLON INTERFACE, I/O 2 (D71419P) CONNECTOR"
"tr opening actuator"
"valve-anti ice pressur"
"RB211 524H-T36/11"

These terms are sought within documents, and if they are found the corresponding text is annotated with the semantic type given by the semantic class of the gazetteer list.

Figure 1:
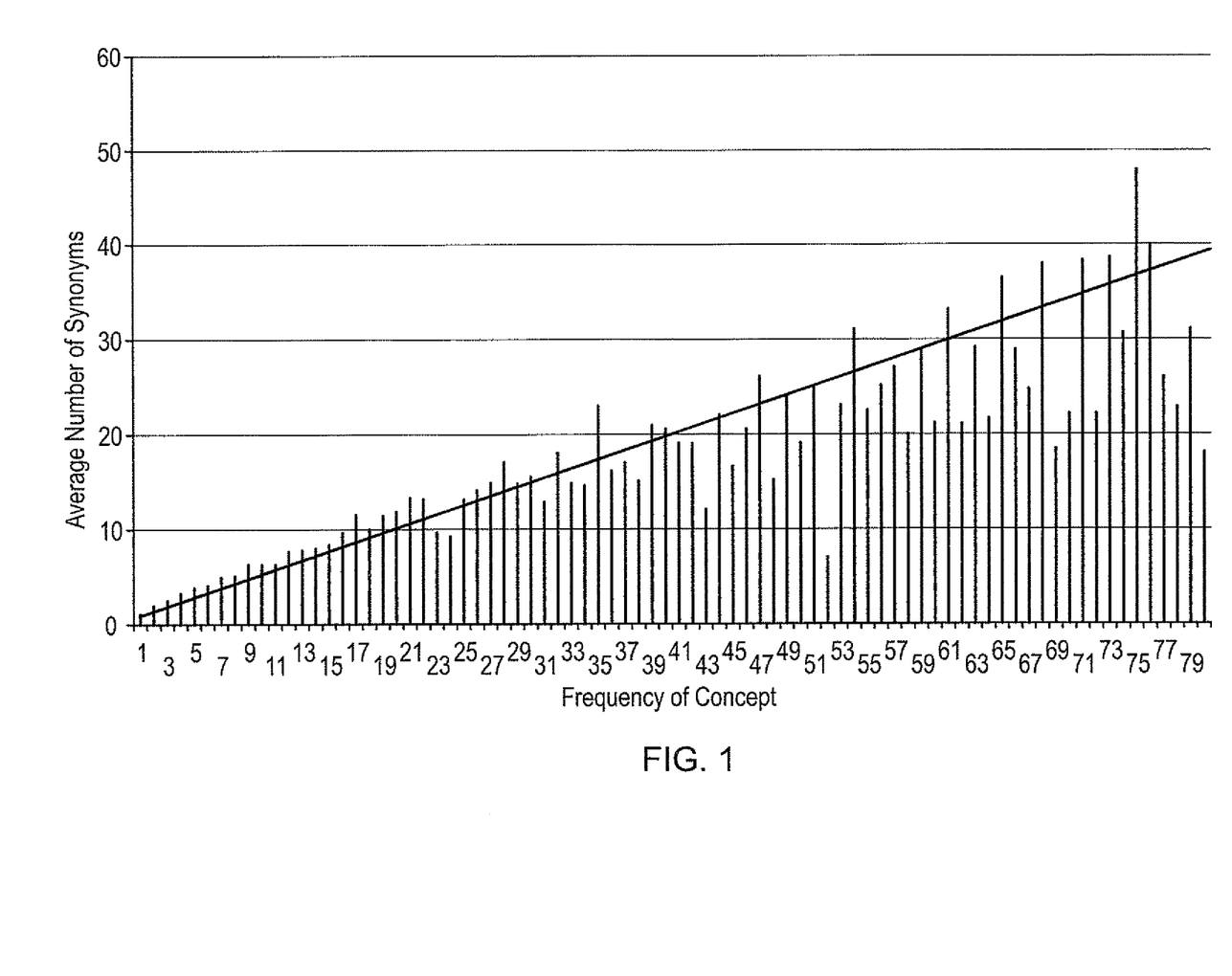
FIG. 1 shows the linearly proportional increase in the number of terms assigned to a concept with the popularity of that concept.

A study of the terms used to refer to components with a particular part number showed that, as the popularity of the part number increases, the number of terms increases in a fairly linear and proportional manner. This is shown in FIG. 1. The increase is due to term variation, spelling differences, lexical, morphological and orthographic differences, word order changes, abbreviations and acronyms. This implies that for any given concept it is unlikely that all the terms can be identified in advance.

Gazetteer lists include lists of precompiled terms with some synonyms, variations and inflections. Unless a term exists in one of the gazetteer lists, it will not be recognised. Because technical domain terms are typified by long strings of nouns where each noun represents an individual concept which itself possesses a long list of synonyms, the combinational and order differences rife in real-world documents mean that an effective gazetteer capable of recognising a fair set of terms is not only very costly to search, but costly to produce and maintain.

Although examples of the second main type, machine learning (heuristic) approaches, do not require rules and gazetteers, they do require examples of correctly extracted entities. This is often provided by domain experts spending time annotating documents. The laborious and costly nature of this process has given rise to the term 'annotation bottleneck' which describes the lack of quality training data.

When using heuristic methods, the assumption has to be made that the training data are representative of the corpus at large. If this is not the case, performance is drastically reduced. As examples of the prior art, the following can be considered.

US 2003/177000 (Mao et al./Verity) shows a method and system for naming a cluster of words and phrases. The system uses a lexical database which already links terms to other semantically similar terms (Similar to WordNet).

US 2009/259459 (Ceusters et al.) describes a Conceptual World Representation Natural Language Understanding System and Method that uses an ontology to represent the relations between concepts (terms), e.g. PARIS is_a FRENCH-CITY. This relies on the string of characters 'paris' being recognised as the entry "paris" in its lexicon/dictionary/database.

US 2005/119873 (Chaney et al./Udico) is concerned with a method and apparatus for generating a language-independent document abstract, and relates to a method of document summarisation with a language-agnostic methodology. The method does not make use of any external resources; instead, it uses statistics based on the length of words as an indication of term importance.

OBJECTS AND SUMMARY OF THE INVENTION

The invention is based on a method and a system for Terminology Recognition that operates by recognising a term's constituent concepts rather than merely its string of characters. The reasoning behind the strategy is that in technical domains it is often the case that two terms can be semantically similar and have a low string distance (i.e. low number of character substitutions, deletions and/or insertions) whereas two other terms can be semantically distant yet have a high string distance.

An example of this can be seen when considering the term "Bicycle Pump", where term variations on the theme might include 'bicycle pumps', 'bicycle pmps'[sic], 'bike pump'. String distance techniques can be successfully employed to relate these terms (as they share large strings of characters in comparatively similar orders); however, the term "Tyre Inflator" (which is semantically similar) and its variations such as 'tire infltr'[sic], 'wheel inflator' are too distant in terms of string distance from 'bicycle pump' to register a match. Conversely, the terms "LPT Stage 4 blade" and "HPC Stage 4 blade" have a very low string distance yet refer to two components that are located on opposite ends of a jet engine, operate under very different environmental conditions and are therefore designed and manufactured to fulfil different purposes.

Series of individual sub-concepts combine to form a main concept. For example, the term "lpc blade leading edge" comprises the sub-concepts [LOW PRESSURE], [COMPRESSOR], [BLADE], [LEADING] and [EDGE]. Together, these sub-concepts refer to the concept [LP C BLADE LEADING EDGE]. Each of the sub-concepts points to a position, an object, a feature or a system and can have numerous synonyms, abbreviations, spelling differences, etc. For a gazetteer to match all terms for the concept [LP C BLADE LEADING EDGE] one would have to duplicate the terms substituting for every synonym of each sub-concept and in each possible order, e.g. 'low press comp blade leading edge', 'low press compressor blade leading edge', 'blade, leading edge—lpc' . . . etc.

According to one aspect of the invention, therefore, there is provided a method of identifying terms and concepts in documents, as defined in claim 1. A method for analysing a string of characters is provided. The string of characters may comprise canonical and non-canonical terms relating to a specific domain. The method may be used to identify concepts in that domain. The method may comprise comparing the terms in the string with a lexicon containing canonical terms for sub-concepts in the domain, canonical groups of such terms, synonyms and lexical categories, so as to produce a sequence of annotations comprising terms from the lexicon. The method may also comprise identifying entities by chunking sequences of annotations according to a grammar. The method may extract terms from a string of characters, for example from a document.

In embodiments of the invention, a matching process is first carried out to convert a list of query terms into a list of sub-concepts, the sub-concepts are grouped into concepts, and the document is searched using these concepts.

The invention, referred to loosely as TR or Terminology Recognition, relates to a method of querying technical domains that recognizes the concepts represented by strings of characters. It can be used to compute conceptual similarity between terms that might differ considerably in form but have the same meaning. TR preferably employs string-distance metrics and a cyclic progression of lexical processing to recognise constituent term concepts that are then combined to form full-term concepts by means of a grammar. Terms can be extracted and identified as being conceptually similar (or dissimilar) to other terms even if they have never previously been encountered.

A key advantage of the invention is the ability to identify entities and hence extract terms from documents on the basis of the combination of a limited number of sub-concepts. This avoids the need for the prior identification of all terms that current methods require. A second key advantage is the ability to introduce or remove concepts and synonyms individually without the need to alter terms which the concept or synonym constitutes. For instance, if one added 'book' as a synonym of 'combustor', 'rear inner book case' can, without any further action, be recognised as identifying the same concept as 'cric' or 'combustor rear inner case'. The combinational effect of the matching methodology reduces the acquisition overhead, resulting in savings in time and costs.

A graphical representation of the terms can be used to index the documents. The documents can be queried using a graph formed by a query term, and the distance between terms can be computed on a conceptual level rather than more traditional string-distance methods—strings of characters that refer to the same thing can be linked, even though they share limited (or no) common characters. This means that legacy documents can be effectively queried for entities using terms that may or may not have been used to refer to the entities in the text.

In embodiments of the invention, the lexicon may contain just a list of (sub-)concepts (e.g. nuts, bolts, blades, cases, for an application to turbine engines) and several synonyms, along with the "parts of term" (similar to Verb/Noun/Adjective) that these concepts may be used as. These parts of term are also denoted "lexical categories". The most important of these synonyms are then used to name clusters of words, so that further intervention (as in US 2003/177000) to form links is not needed.

In embodiments of the invention, an ontology is used to represent the relationships within the terms, as opposed to between them. For instance, the structure of the concept "combustor inner case" is represented by "CASE has position INNER". An important facet of Terminology Recognition is the matching algorithm. For instance, if 'combustion innr casing' [sic] does not exist in the lexicon as-is, the matching algorithm will attempt to match it to a close enough entity (i.e. 'combustor inner case').

Embodiments may be performed using a computer program. The computer program may be stored on a computer readable medium. When executed by a computer, the computer program may instruct the computer to perform the methods described herein.

Further, Terminology Recognition does not account for term importance, as in US 2005/119873; rather, it essentially extracts terms that are made up of words similar to those found in a predefined lexicon before deriving and allowing access to the relationships between the words.

BRIEF DESCRIPTION OF THE DRAWINGS

For a better understanding of the invention, embodiments of it will now be described, by way of example, with reference to the accompanying drawings, in which.

DETAILED DESCRIPTION OF THE PREFERRED EMBODIMENTS

The Terminology Recognition scheme uses a set of lexicons (a separate lexicon for each semantic type involved within a domain—e.g. a lexicon of positional terms, a lexicon of agents, a lexicon of features, a lexicon of mechanisms, etc.) which contain all domain-specific concepts, lists of their distinct synonyms, and the concept's "part-of-term", a property similar to a part of speech in that, while part-of-speech denotes whether a word can be a noun, verb, etc., "part-of-term" denotes whether the term is a system/object/type etc. The system compares text to the distinct synonyms using a series of matchers involving string similarity metrics. The matchers are operated in such a way that an exact match to these distinct synonyms is not required—and in practice hardly ever occurs—as minor spelling differences and affixes are considered using string-distance metrics and stemming algorithms.

Once terms have been tagged (annotated) with sub-concepts, a grammar is employed to group congruent sub-concepts into an entity which describes a concept—for instance, a date, a part, an engine, a mechanism, etc. Different entities can possess various properties; for example, a date can have a year, a month and a day, an engine serial number can have an engine family and a run number, a component can have a system, an object and a position. The Terminology Recognition scheme analyses the constituent entity sub-concepts to determine the type of entity and then attempts to extract the relevant property values.

Figure 2:
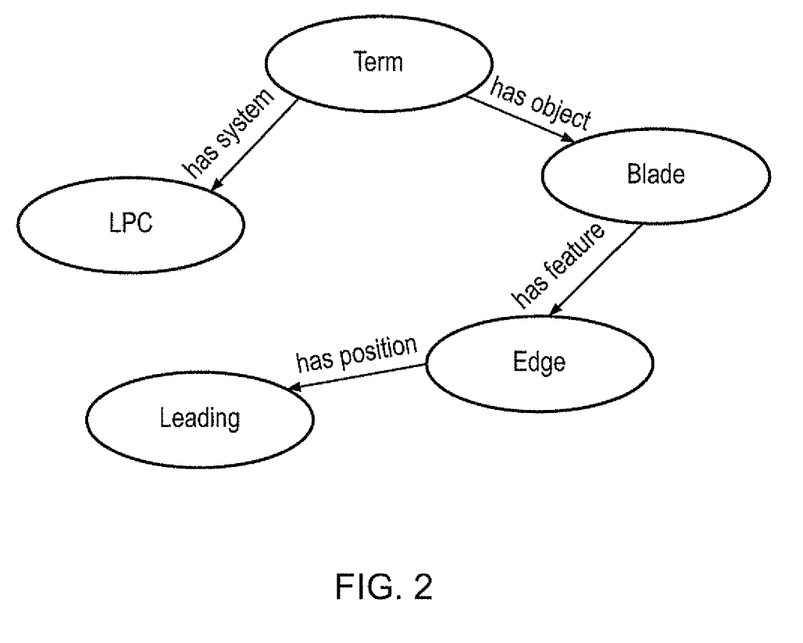
FIG. 2 shows a graphical representation of the term "Low-Pressure Compressor Blade Leading Edge"

The Terminology Recognition method then outputs a graphical representation of the term, within which the concept is represented as a series of nodes and edges corresponding to property values and types. This breaking down of the terms into combinational units can be implemented using Resource Description Framework (RDF—see www.w3.org/RDF), as shown in FIG. 2.

A specific term requires several parts of term: for example, in the case of a part term, an object (a type of thing such as sensor), a type (the type of object, e.g. speed), and an application (where the object is applied, e.g. HP Compressor) are required. Two advantages of representing the term as a graph are:

1) The graph representation can be used to federate terms by type or system (e.g. list all components related to the HPC, or list all sensors within the engine).
2) The graph representation can be used by a similarity metric which uses the values of the properties to compute similarity (or, inversely, distance) based on sub-concepts.

The input to the Terminology Recognition system is a string of characters, which could be an entire text document or a simple term representing a mechanism or part, for example "leading edge abrasion", or "combustor rear inner case". This string of characters will be referred to as the query string.

The initial operation is to split the query string into all possible n-grams less than a limit. For instance, the three-word term 'w1 w2 w3' is split into:

w1, w2, w3, w1w2, w2w3, w1w2w3

To improve performance for large queries, n-grams up to the limit L are considered. For instance, for the term 'w1 w2 w3 w4 w5' with L=3, the following n-grams are produced:

w1, w2, w3, w4, w5, w1w2, w2w3, w4w5, w1w2w3, w2w3w4, w3w4w5

The limit L is domain-specific and should be set by examining the lexicon. For instance, in the aero-engine domain, the longest compound term was five words long, so L should be set to 5 for this domain.

The n-grams are then matched to concepts defined in the lexicon by a series of four matchers, as will now be explained.

Stage 0 Matcher

Stage 0 matches terms that are represented by regular patterns, such as engine marks (Trent 800, T-800, RB211-T-892), stage ranges (LPT Stage 2, LP2 T, LP Stg.2), engine serial numbers (51123, 71123), ATA codes (72-00-00), and service bulletins (SB72-C927), to name but a few. These are matched, for example using regular expressions, i.e. formally constructed textual search patterns (see www.regular-expressions.info)

If an n-gram matches, an annotation is created. The annotation includes information such as the start and end offsets (the positions within the term where the match begins and ends), the semantic type of annotation (whether the entity is a part, position, number, feature, etc.—this information comes from the title of the lexicon the match was found in), the part of term (whether the term in the lexicon is an object, system, application, date etc.), the order number (how preferred this annotation is over annotations which include it in a combined term) and the canonical representation (standard form) of the term as listed in the lexicon.

These annotations are added to a list.

Stage 1 Matcher

Stage 1 matches N-Grams as they appear in the lexicon. A normalised string-distance metric, e.g. Levenshtein, is used to compute a similarity score bounded between 0 (totally dissimilar) and 1 (identical). See Levenshtein VI (1966), "Binary codes capable of correcting deletions, insertions, and reversals", Soviet Physics Doklady 10: 707-10. This string distance score is then normalised by the difference in length between the two terms (but only if there is a difference); this is done in such a way as to penalise heavily term pairs that have similar runs of characters but are of different lengths. This reduces incorrect matching, something that could lead to a missed annotation later on. A threshold 'Th' is set, so that, if a term in the lexicon scores a similarity above this threshold, the n-gram is annotated with this matching term. In the case of an engine, Th may set to 0.85, but various values could be used to achieve different results. Because the chance of misspelling a term increases as the length of the term increases, terms that are longer than a certain threshold number of characters, e.g. 12, are not normalised by the difference in term length if the difference in term length is less than or equal to, say, 3 characters:

If the term is 12 characters or fewer:

$$\text{Similarity} = \frac{\text{Levenshtein}(t1, t2)}{|\text{Length\_t1} - \text{Length\_t2}| + 1}$$

If the term is longer than 12 characters:

$$\text{Similarity} = \text{Levenshtein}(t1, t2)$$

Of course, thresholds other than 12 may be suitable, depending on the application. To avoid many unnecessary computations (solely to improve performance), the query gram is only compared to the lexicon term if the two terms have a length difference less than a certain number of characters. For instance, it is impossible for the term 'oil' to score above 0.85 with the term 'high-speed gear box'. For the engine query, the character difference threshold is set to 3 characters.

Once all n-grams have been passed through the matcher, they, or rather their annotations, are combined with those from stage 0. There may be annotations that overlap; for example, 'LP' and 'LP COMPRESSOR' are both valid annotations for the term 'LP COMPRESSOR'. Both annotations are correct; however, the annotation 'LP COMPRESSOR' contains more information and should be favoured over separate annotations. If two annotations are found to overlap, the annotation with the lower order number is chosen. If two annotations of the same order overlap, the annotation that covers the longer portion of text is chosen.

Stage 2 Matcher

The stage 2 matcher accepts the list of annotations made so far and replaces the region matched to the annotations with the canonical form of the term; then a stage 1 matcher is run again. The purpose of this is to recognise variations in compound terms that have not been listed in the lexicon. 'High Press Comp' is not listed as a variation of 'HP C', but 'High Pressure Compressor' is. The annotations 'High', 'Press' and 'Comp' are replaced with their canonical or standard representations 'high', 'pressure' and 'compressor'. This expression then matches the variation of 'HP C' listed in the lexicon, so the annotation is made. This annotation overlaps with the previous annotations, but because the order of 'HP C' is lower than 'High', 'Pressure' and 'Compressor' separately, the former annotation is chosen (the total set of annotations is passed through an annotation resolver).

Stage 3 Matcher

Analysing the annotations made after stage 2 may reveal n-grams that have not been annotated. The stage 3 matcher performs further processing on these strings (in a number of discrete steps) in an attempt to match them to terms in the lexicon.

Stage 3 extracts tokens of the query that are unannotated. These tokens are split on white space and are assumed to be single words (if they form part of a compound term, this is caught later when a stage 2 matcher is run on the resulting stage 3 annotations). The first step of stage 3 involves the removal of suffixes: the unannotated grams are stemmed and compared to stemmed versions of terms in the lexicon, in exactly the same manner as the stage 1 matcher. The second step of stage 3 attempts to correct misspelled words: if the word is not found in a standard word list, such as a standard English dictionary, a list of spelling suggestions is then computed and then each checked against terms in the lexicon in a similar manner to the stage 1 matcher. The third step of stage 3 accounts for the practice of removing vowels and concatenating terms in technical domains, by comparing the unannotated term against the concatenated pairs of terms in the lexicon with vowels removed (a blocking technique is used here to cut down on many unnecessary computations: only term pairs that when their vowels have been removed and have been concatenated are a similar length to the unannotated term are considered).

These annotations are then passed to the stage 2 matcher, where the terms are replaced by their canonical representations and subsequently passed to the stage 1 matcher that matches the terms to those in the lexicon.

Figure 3A:
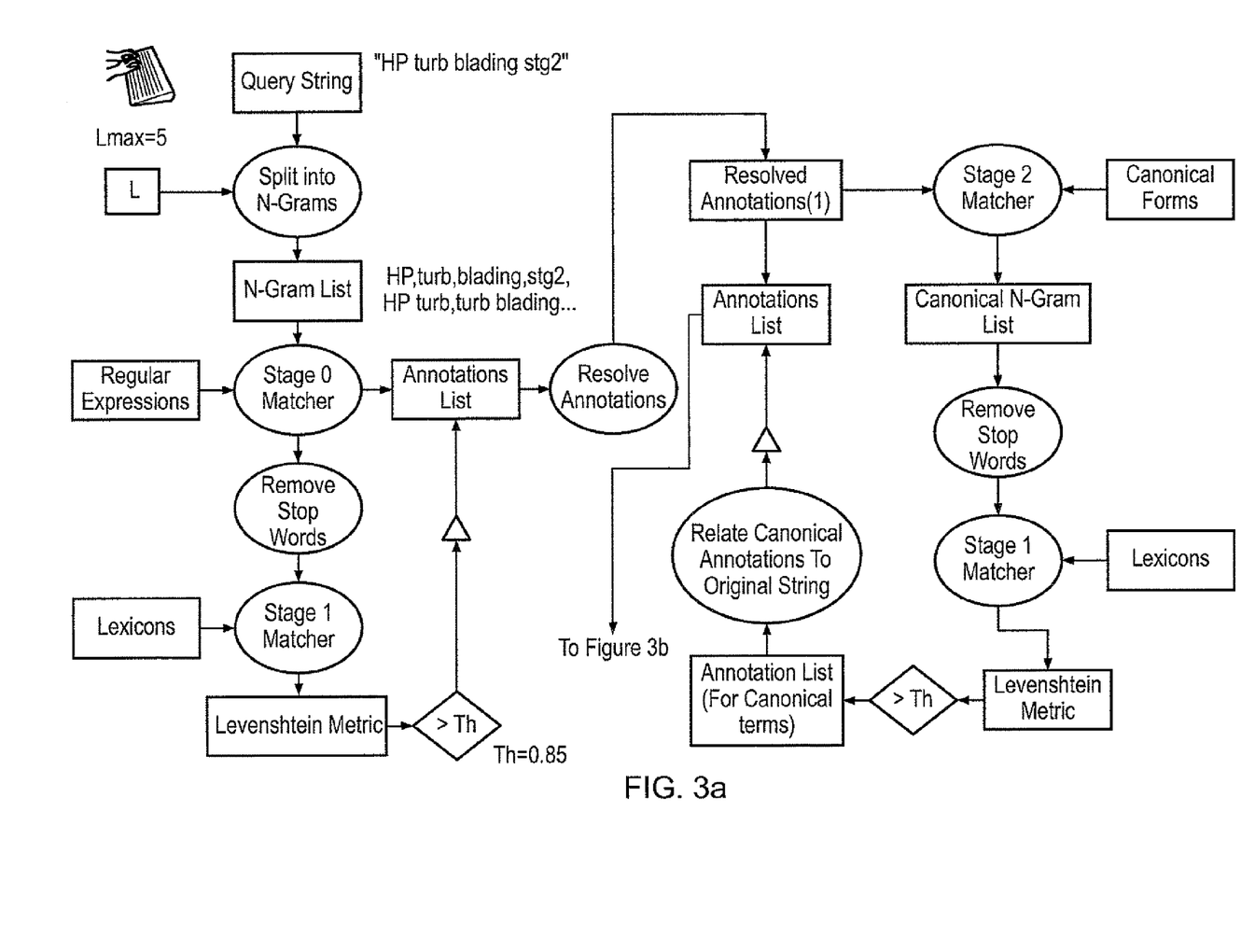
FIGS. 3a and 3b show the four-stage cyclic matching process used in a preferred embodiment.
Figure 3B:
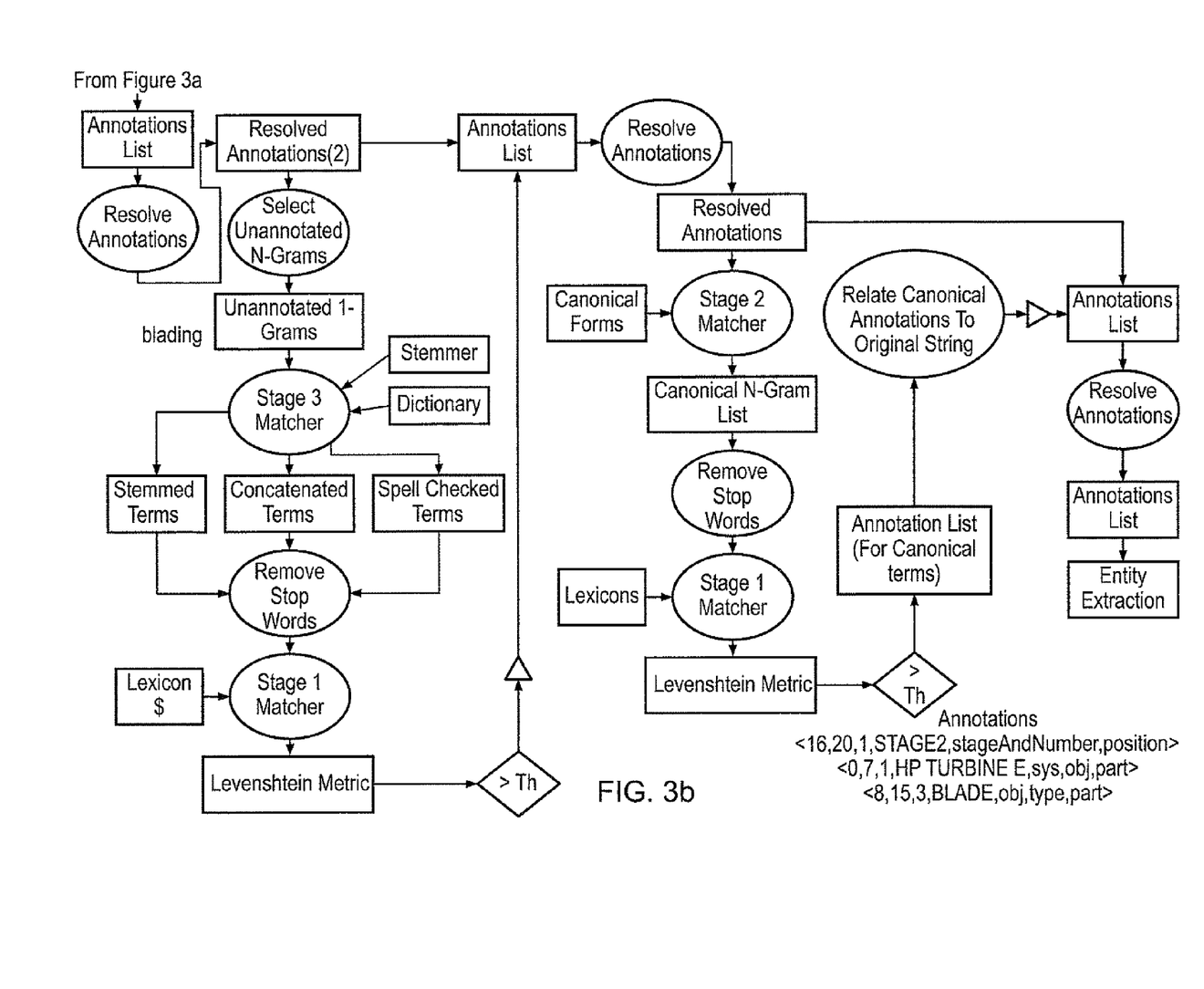

The annotations are then resolved so that no annotations overlap. The four stages are shown in FIG. 3.

Example of Matching

A simple lexicon contains the following concepts and synonyms:

[COMBUSTOR], with synonyms <combustor> and <comb>
[REAR], with synonyms <rear>
[INNER], with synonyms <inner>, <inn>
[CASE], with synonyms <case>, <housing>
[COMBUSTOR REAR INNER CASE], with synonyms <combustor rear inner case> and <rear inner combustor case>

The query term "rear inner combustor case" would be matched with the concept [COMBUSTOR REAR INNER CASE] with the stage 1 matcher. The term is therefore annotated with the [COMBUSTOR REAR INNER CASE] concept. (The stage 0 matcher would not have produced any match).

The query term "rear inner comb case" would be matched with the concepts [REAR] [INNER] [COMBUSTOR] [CASE] with the stage 1 matcher. These annotations are passed to the stage 2 matcher which then compares the canonical forms. The canonical forms match a synonym for the concept [COMBUSTOR REAR INNER CASE] so the term "rear inner comb case" is annotated with the concept [COMBUSTOR REAR INNER CASE].

The query term "rear inner combusting case" would be matched with the concepts [REAR] [INNER] [CASE] by the stage 1 matcher. These annotations are passed to the stage 2 matcher which then compares the canonical forms; the canonical forms do not match any synonym. There is a portion of the original term that has not been annotated; this portion is passed to the stage 3 matcher where it is stemmed to produce the term "combust". The synonyms in the lexicon are stemmed and compared, the stemmed form of <combustor> is also "combust" and, because there is a match, the term "combusting" is annotated with the concept [COMBUSTOR]. When the term is compared with the stage 2 matcher, the term "rear inner combusting case" is annotated with the concept [COMBUSTOR REAR INNER CASE] because the canonical forms of the individual concepts [REAR] [INNER] [COMBUSTOR] [CASE] match a synonym of the [COMBUSTOR REAR INNER CASE] concept.

One could at any stage alter the lexicon so that the term "book" was also a synonym of the [COMBUSTOR] concept: i.e. [COMBUSTOR], with synonyms <combustor>, <comb> and <book>

The term "rear inner book case" would then also be annotated with the concept [COMBUSTOR REAR INNER CASE], because the canonical forms of "rear", "inner", "book" and "case" match a synonym of [COMBUSTOR REAR INNER CASE]. Notice that the synonym <rear inner book case> did not have to be added to the [COMBUSTOR REAR INNER CASE] concept.

Figure 4:
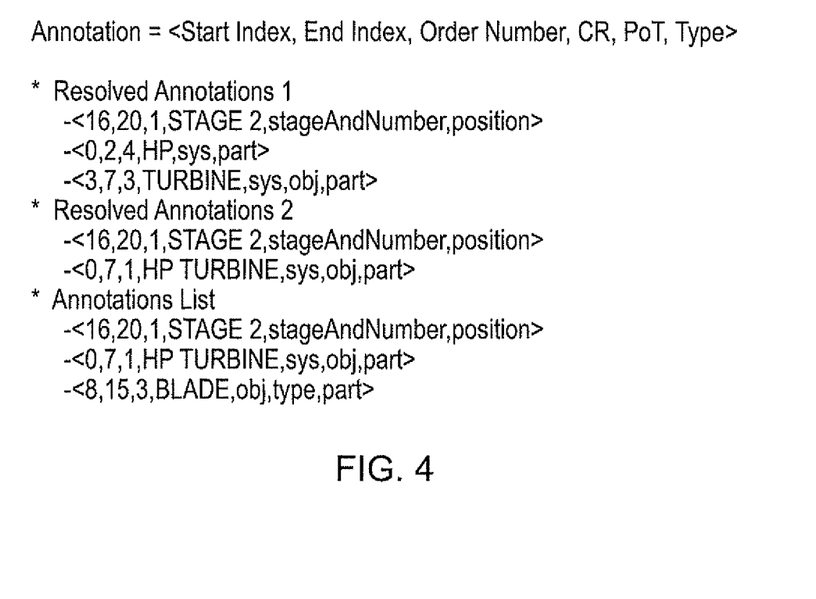
FIG. 4 shows typical results from the matching process at various stages.

The progress of a typical process is shown by reference to the emerging annotations in FIG. 4.

Entity Recognition

Once annotations have been made, the annotations are chunked, i.e. formed into small grammatical groups, in accordance with a chunking grammar; that is, annotations of types that are specified in the grammar to be chunkable and that are within a certain number of characters of each other are considered to relate to the same entity.

The resulting string of annotations is then analysed to determine their type; for example, a string of annotations from the parts lexicon mixed with annotations from the position lexicon are assumed to reference a component. A string of annotations from the marker list is assumed to reference some kind of marker (engine serial number, TV (technical variance) number, service bulletin number, etc.). These strings of annotations create an entity object, which includes the inferable information about the concept referenced, for example, the ATA number 72-34-00 has the description 'LP C Transportation Parts'.

Figure 5:
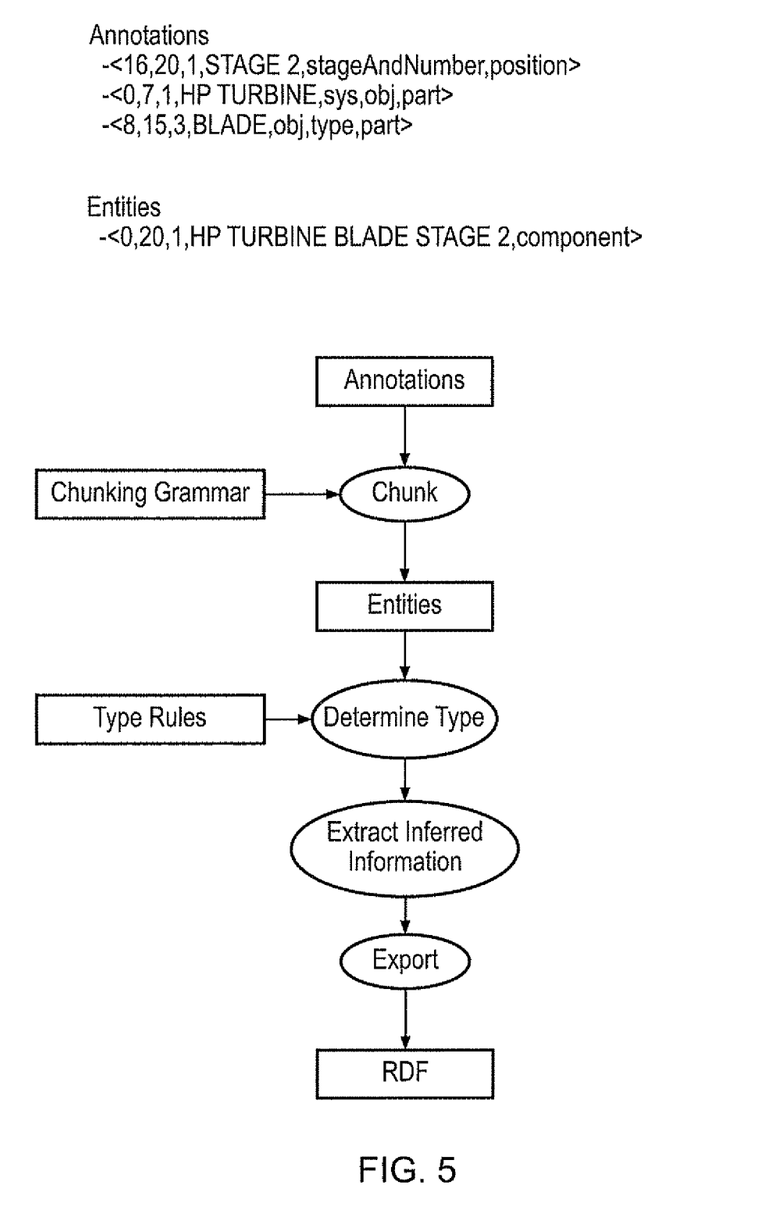
FIG. 5 shows the process of entity extraction, following the matching process.

Component terms' parts of term are analysed using a grammar, the sub-concept's part of term is selected from those listed in the lexicon in accordance with a grammar, and a parse tree is generated. For example: 'lpc blade leading edge' has two system references 'low pressure' and 'compressor', the object is 'blade', and the blade has feature 'edge' which has position 'leading'. This information is added to the term graph and is exported using RDF. This is shown in FIG. 5.

The system can be used, for instance, for indexing of existing documents and databases using widely varying terminology, so as to identify domain-specific entities, for searching an indexed database by reducing an arbitrary query to standard terminology (canonical terms), or as a "terminology checker" akin to a spelling checker.

One alternative method of reducing terminology variation is to employ a Controlled Vocabulary, A Controlled Vocabulary forces the use of specific terms when referring to particular concepts (one concept per term). This would allow an effective search of documents written in the controlled vocabulary but would not be as effective when searching legacy documents.

In a further development of the invention, the methodology employed by the Terminology Recognition concept may be abstracted a level. The system currently constructs representations of terms based on the semantic type of their sub-concepts and associated grammar; terminology recognition can be abstracted so that any process or thing can be constructed by any number of contiguous entities, for instance:

A mechanism comprises a driver, the mechanism itself, and a type.

An impact comprises a customer and a recovery.

A document context comprises a date, a customer and a flight regime.

The methodology used by the Terminology Recognition invention is domain-independent, so a domain-dependent lexicon must be supplied. This lexicon is a specification of the common concepts found in the domain. A lexicon describing office furniture may define 'desks', 'legs', and 'drawers'; these three concepts mix and match to form the concepts 'desk', 'desk legs' and 'desk drawers'. In an aerospace-engine lexicon one may define 'fan', 'blade' and 'shaft', which can be combined to form 'fan blade', 'fan shaft' etc.

Terminology Recognition Context

An example application of TR is a search application for documents in the form of aerospace engine summary reports, where engine component terms are used with a high degree of term variation (e.g. orthographic differences, spelling errors, term variation, abbreviations, acronyms and lexical differences). Given a query term, the conceptual similarity between all the terms in the index can be computed resulting in a results set comprising terms (and documents) which reference the same concept as the query, but using different terms.

Once a term has been annotated (tagged as representing a particular concept), the concept can be analysed to uncover additional information. The Engine serial number 51123 signifies a Trent 800 engine that is currently in service that was the $123^{rd}$ off the production line. The sub-concepts can be used to better classify ATA Spec 100 or JASC codes—an internationally used numbering scheme for aircraft parts and processes (See: http://av-info.faa.gov/sdrx/documents/JASC_Code.pdf).

Terminology Recognition can be used to support multiple processes in different situations. Terminology Recognition has already been used (in tests) to identify single and multi-word domain-specific terms such as component names, features, faults, dates, etc, in documents and normalise them to a standard form which can then be saved (along with the original form) to an index. For example, given the sentence fragment:

" . . . on Jun. 8, 2007, the IP2 T Blade on ESN51123 was found to be cracked . . . ."

Terminology Recognition would identify four entities: a date, a component, an engine and a deterioration mechanism. Associated with these entities will be: the original term, a standard version of the term, and additional information. This can be shown in the XML fragment:

```
<sentence>
    <entity type="date">
        <originalText>June 8th, 2007</originalText>
        <standardForm>08-06-2007</standardForm>
        <year>2007</year>
        <month>June</month>
        <day>08</day>
    </entity>
    <entity type="component">
        <originalText>IP2 T Blade</originalText>
        <standardForm>Intermediate Pressure Compressor Stage 2 Blade</standardForm>
            <hasSystem>IPC</hasSystem>
            <hasObject>
                Blade
                <hasPosition>Stage 2</hasPosition>
            </hasObject>
    </entity>
    <entity type="Engine">
        <originalText>ESN51123</originalText>
        <standardForm>ESN51123</standardForm>
        <engineType>Trent 800</engineType>
        <inService>True</inService>
        <runNumber>123</runNumber>
    </entity>
    <entity type="mechanism">
        <originalText>cracked</originalText>
        <standardForm>crack</standardForm>
    </entity>
</sentence>
```

Within this XML fragment (of course, XML is only an example of TR output data), it can be seen that Terminology Recognition has inferred information such as the engine type and run number, and derived the structure of the component term (the component comprises a system and an object, and the object has the position); these have been extracted and stored from the Engine Serial Number entity.

The application of Terminology Recognition is separate to the methodology: TR can in particular be used as an application programming interface or API. Now that the ability exists to extract the entities along with their standard form, the entities can be used to improve search. Here the Terminology Recognition system stores the standard form of terms along with the form found in the document; a user will search using a term of their choice, and documents that use different terms to refer to the same concept will be returned. Search engines are currently not capable of doing this unless a list of synonyms already exists.

Terminology Recognition can also be used in a 'spell-checker' scenario, when an Engineer writes a report, Terminology Recognition (which can be run as a VisualBasic macro) analyses the text and detects entities on the fly. For instance, as the user types 'IP NGV Ring' the macro underlines the term because Terminology Recognition has recognized the term as being ambiguous; by referencing the Engine Parts Catalogue, which is machine-readable, it can be seen that there are two rings in the IP system with an application of NGV—the Split ring, and the Stand-Off ring. This ambiguity may cause major issues and can even be dangerous, so in a similar manner as correcting a spelling error, the user right-clicks the term and the two possible terms (IP NGV Split Ring & IP NGV Stand-Off Ring) are presented. The Engineer clicks the term they mean and continues typing the report. The term is now fully unambiguous and uses correct, standard terminology.

The invention therefore has application to many fields. For instance, continuing studies into the use of the Terminology Recognition invention in biomedical and botanical domains show promising results.

We claim:

1. A method executed by a hardware processor for analysing a string of characters, including canonical and non-canonical terms relating to a specific domain, to identify concepts in that domain, comprising the following steps:

comparing the terms in the string with a lexicon containing canonical terms for sub-concepts in the domain, canonical groups of such terms, and synonyms and lexical categories, so as to produce a sequence of annotations comprising terms from the lexicon; and identifying entities by chunking sequences of annotations according to a grammar, wherein the lexicon includes a list of terms in canonical form, with synonyms, and the step of comparing the terms uses matching stages, namely:

Stage 0: string terms are matched with corresponding terms in the lexicon;

Stage 1: terms that do not immediately match are analysed for similarity using a string comparison technique;

Stage 2: the parts of the string so far matched are replaced by the corresponding canonical terms from the lexicon and the Stage 1 operation is performed again; and Stage 3: terms not so far annotated are analysed using a stemmer and a dictionary to produce lexical terms, and Stages 2 and 1 are run again, and the matching stages are run cyclically in the order 0, 1, 0, 2, 1, 0, 3, 2, 1, 0.

2. A method according to claim 1, in which terms are added to the lexicon as required.

3. A method according to claim 1, in which to identify groups of terms, a string including two or more words is split into n-grams, where n ranges from 1 to a predetermined limit L, before the analysis is performed, and these n-grams are compared to the canonical groups.

4. A method according to claim 1, in which the chunking step is performed by grouping the annotations in accordance with a grammar, and entities are identified by association of annotations of complementary types.

5. A method according to claim 4, in which the types include components, features, mechanisms and markers, and the lexical categories include systems, objects, features, and positions.

6. A method according to claim 1, in which the entities are represented graphically, using nodes and edges to represent parts and relationships.

7. A method according to claim 1, used in an indexing procedure, where a database is indexed with concepts corresponding to the entities found.

8. A method according to claim 1, used in a search procedure, where the query string is reduced to canonical terms which are then used for the search.

9. A method according to claim 1, in which the terms and the lexicon relate to an aero-engine, and the entities are components or systems.

10. A non-transitory computer readable medium having stored thereon a computer program configured to perform, on execution, the method of claim 1.

11. A system for analysing strings of characters, comprising:

a lexicon of terms and groups of terms relevant to a specific domain, in canonical form, with synonyms and lexical categories;

a device receiving the string to be analysed;

a matcher comparing terms in the query with terms in the lexicon, and annotating the string when a match is found; and an extracting part identifying entities from the document that correspond to the annotations, wherein the matcher has multiple stages:

Stage 0: string terms are matched with corresponding terms in the lexicon;

Stage 1: terms that do not immediately match are analysed for similarity using a string comparison technique;

Stage 2: the parts of the string so far matched are replaced by the compounding canonical terms from the lexicon and the Stage 1 operation is performed again; and Stage 3: terms not so far annotated are analysed using a stemmer and a dictionary to produce lexical terms, and Stages 2 and 1 are run again, and the stages of the matcher are run cyclically in the order 0, 1, 0, 2, 1, 0, 3, 2, 1, 0.

* * * * *